Oct. 29, 1968  M. A. MESSA  3,408,288
INDUSTRIAL WASTE WATER TREATMENT APPARATUS AND METHOD
Filed Dec. 3, 1965  4 Sheets-Sheet 1

INVENTOR.
MATTHEW A. MESSA
BY Seidel & Gonda

ATTORNEYS.

INVENTOR.
MATTHEW A. MESSA
BY
ATTORNEYS.

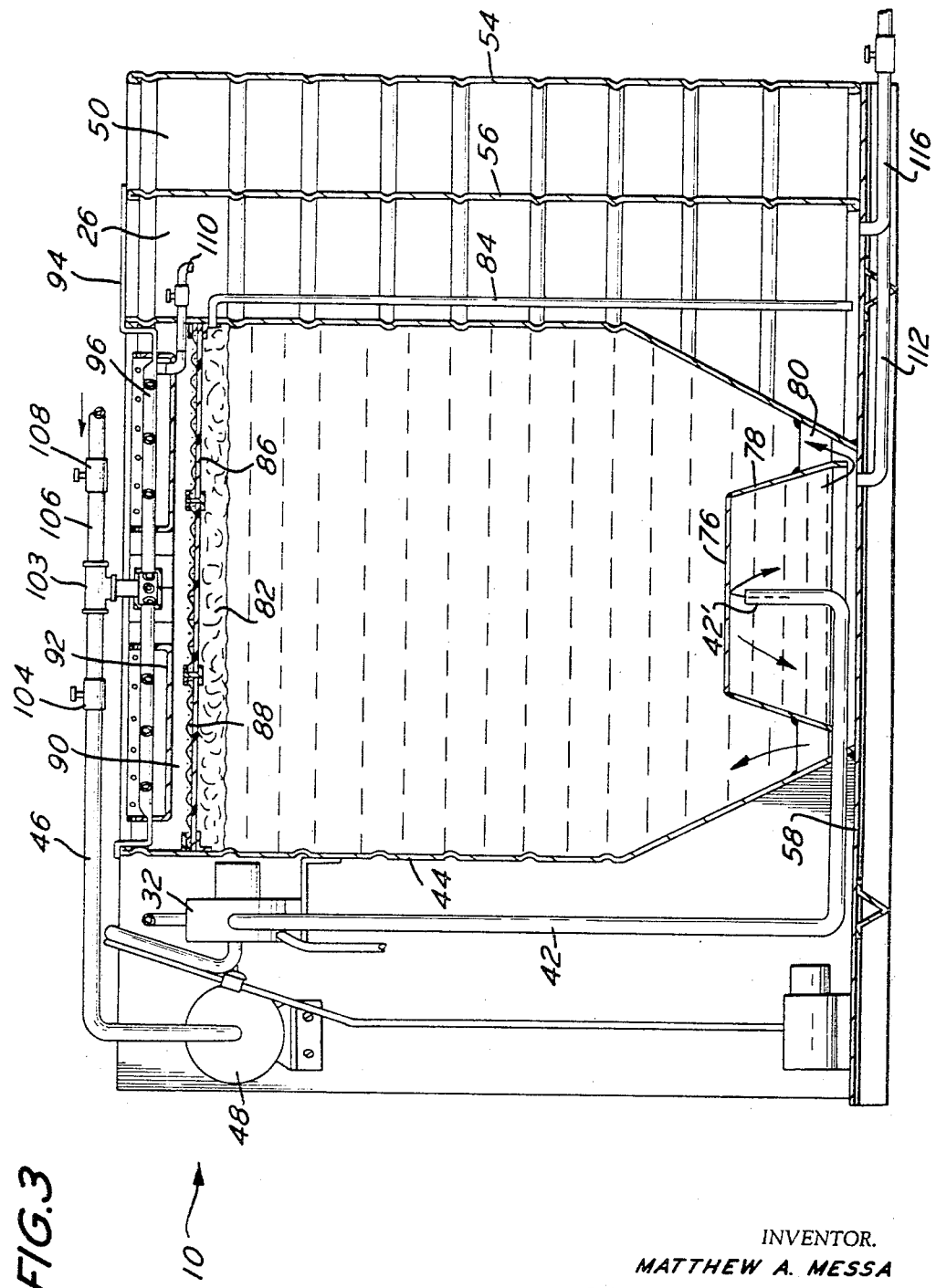

United States Patent Office 3,408,288
Patented Oct. 29, 1968

3,408,288
INDUSTRIAL WASTE WATER TREATMENT
APPARATUS AND METHOD
Matthew A. Messa, Wyncote, Pa., assignor, by mesne assignments, to Met-Pro, Inc., Lansdale, Pa., a corporation of Pennsylvania
Continuation-in-part of application Ser. No. 503,567, Oct. 23, 1965. This application Dec. 3, 1965, Ser. No. 511,470
13 Claims. (Cl. 210—20)

ABSTRACT OF THE DISCLOSURE

Apparatus and method are disclosed for processing waste liquids to remove turbidity, solids, ABS, colloidal suspensions, etc. An upflow clarifier is surrounded at least in part by a sludge chamber which in turn is surrounded at least in part by a holding tank. The waste liquid is pretreated in the sludge chamber by sludge, coagulant and/or a bleaching chemical. The pretreated liquid is pumped to the bottom of an upflow clarifier and mixed with a coagulant and a pH corrective chemical. The upflow clarifier has a floc blanket whose upper limit is defined by a porous filter member to prevent the blanket from being upset. The effluent which passes through the floc blanket and porous member is pumped to the holding tank.

---

This invention relates to industrial waste water treatment apparatus and method. In particular, the present invention relates to apparatus and method for purifying waste liquids containing turbidity, suspended solids, foreign matter, detergents, etc.

This application is a continuation-in-part of my copending application Ser. No. 503,567, filed on Oct. 23, 1965, and entitled, Water Treatment Apparatus and Method.

The present invention processes raw or waste liquids to purify the same and is to be distinguished from saline water conversion units which are constructed and oriented to convert salt water into fresh water. The fresh water effluent produced by the apparatus of the present invention has been attained heretofore by prior art devices having a large number of disadvantages or otherwise lack the advantages of the present invention.

The prior art water purification devices include a large number of complicated controls, circuits, electronic and mechanical equipment, etc. The apparatus of the present invention eliminates to a large extent expensive components which require maintenance and add substantially to the cost of the equipment. Prior art devices utilize separately installed underground sludge tanks and separate holding tanks, each of which are eliminated by the present invention.

Prior art devices utilize mixing chambers, downcomers, an agitator within the downcomer, all of which have been eliminated by the present invention. Prior art devices utilizing an upflow clarifier are always subject to having the floc blanket upset which requires a shut-down of the equipment. The present invention is not subject to having the floc blanket upset.

The apparatus and method of the present invention have numerous advantages including positive coagulation without upsetting the floc blanket in an upflow clarifier. The present invention does not require continuous surveillance as to the status of the floc blanket to be certain that the same is not upset or bubbles over. The present invention provides water purification apparatus which is substantially simpler than that proposed heretofore and substantially more inexpensive while having the same capacity. The apparatus of the present invention can be utilized for longer runs, that is, it can be continuously utilized for longer periods of time without requiring the equipment to be shut down for cleaning. The apparatus of the present invention can be stopped and started, or pulsed, all without substantial set-up time or interference with the floc blanket.

In accordance with the present invention, the raw liquid to be treated is mixed with desired chemicals and introduced into the sludge chamber surrounding an upflow clarifier. Within the sludge chamber, the raw liquid is filtered to a certain extent, turbidity is removed to a certain extent, suspended solids and foreign matter are coagulated, etc. From the sludge chamber, the thusly treated raw liquid is then mixed with chemicals and introduced into the upflow clarifier. A positive means is provided in the upflow clarifier to define the upper limit of the floc blanket and a means is provided thereabove for removing the effluent from the clarifier. The thusly removed effluent is then introduced into a storage chamber surrounding the sludge chamber.

The chemicals mixed with the raw liquid or partially treated liquid may include a pH correction chemical, a coagulant, a bleach, a disinfectant, etc. These chemicals are preferably introduced into the liquid to be treated on the inlet side of a rotary mixing pump, so as to provide intimate mixing of the same.

The floc blanket in the upflow clarifier coagulates the same particles of impurities and filters out impurities having a particle size less than about 25 microns. The positive means defining the upper limit of the floc blanket is preferably in the form of a porous substrate capable of filtering out impurities having a particle size greater than 25 microns. The liquid to be processed may be pumped directly to a storage chamber after passing through the porous substrate or may be further filtered if desired depending upon the nature of the system with which the present invention is to be utilized.

Such further filtering of the effluent may be desired when the present invention is utilized in conjunction with the particular industrial process. When the present invention is utilized in conjunction with a business establishment, such as a laundromat or a car wash, the effluent after passing through the porous substrate may be immediately reused. By enabling the waste liquids to be treated by the present invention and then reused, the cost of business establishments or industrial systems may be substantially reduced while at the same time making available water for human consumption, thereby alleviating water supply shortages. At the same time, the sewer rents of business establishments may be substantially reduced. Also, the problem of introducing industrial waste liquids into rivers or other natural resources is alleviated by means of the present invention.

It is an object of the present invention to provide a water treatment apparatus and method which is simple, inexpensive and reliable.

It is another object of the present invention to provide water treatment apparatus and method having an upflow clarifier which includes means to provide a positive upper limit for a floc blanket.

It is another object of the present invention to provide a water purification apparatus and method wherein a floc blanket is not susceptible to being upset or bubbling over.

It is another object of the present invention to provide a water treatment apparatus and method which pretreats the raw liquid before the same is introduced into the upflow clarifier.

It is another object of the present invention to provide a water treatment apparatus and method which pretreats the water, treats the water in the upflow clarifier, and restores the water in a surrounding chamber while at the same time enabling the apparatus to be utilized for longer runs with heavily contaminated water.

Other objects will appear hereinafter.

For the purpose of illustrating the invention, there is shown in the drawings forms which are presently preferred; it being understood, however, that this invention is not limited to the precise arrangements and instrumentalities shown.

FIGURE 3 is a sectional view taken along the line 3—3 in FIGURE 2.

Referring to the drawing in detail, wherein like numerals indicate like elements, there is shown in FIGURE 1 an industrial waste water treatment apparatus designated generally as 10.

Figure 6:
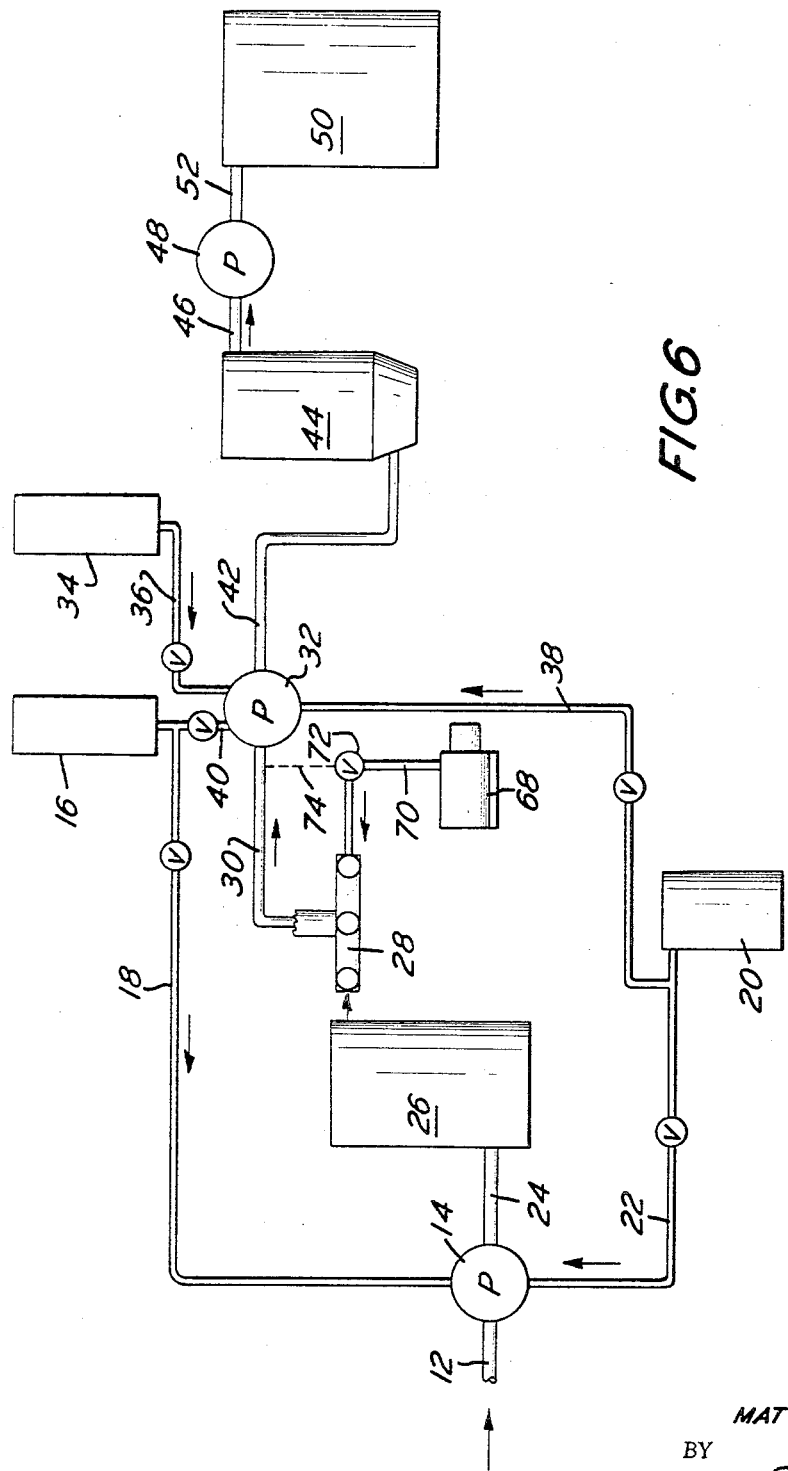
FIGURE 6 is a schematic flow diagram of the apparatus and method of the present invention.

Referring initially to the flow diagram of FIGURE 6, it will be seen that the apparatus 10 includes a pump 14 receiving industrial waste liquids to be treated by way of conduit 12. A coagulant, such as alum, is introduced into the inlet side of pump 14 by way of valved conduit 18 connected to a tank 16. A bleaching and/or disinfectant chemical may be introduced to the inlet side of pump 14. Thus, chlorine gas from tank 20 may be introduced at the inlet side of pump 14 by way of valved conduit 22. The liquid to be treated is mixed with the chemicals within the rotary pump 14 and delivered by way of discharge conduit 24 to a sludge chamber 26.

Within sludge chamber 26, impurities, turbidity, foreign matter, and the like is coagulated and the liquid is filtered by means of the sludge. The liquid to be treated is removed from the sludge chamber 26 by way of filters 28 on one end of conduit 30. The other end of conduit 30 is connected to the inlet side of pump 32. Tank 16 is also connected to the inlet side of pump 32 by way of valved conduit 40. A chemical such as a pH correction chemical may be introduced to the inlet side of pump 32 by way of valved conduit 36 communicating with a tank 34. If desired, additional chlorine may be introduced to the inlet side of pump 32 by way of valved conduit 38.

The thusly treated liquid mixed with the chemicals is then pumped through conduit 42 by pump 32 to an upflow clarifier 44. From the upflow clarifier 44, the effluent is pumped by pump 48 through conduit 46 and delivered by way of conduit 52 to a storage tank 50.

Figure 1:
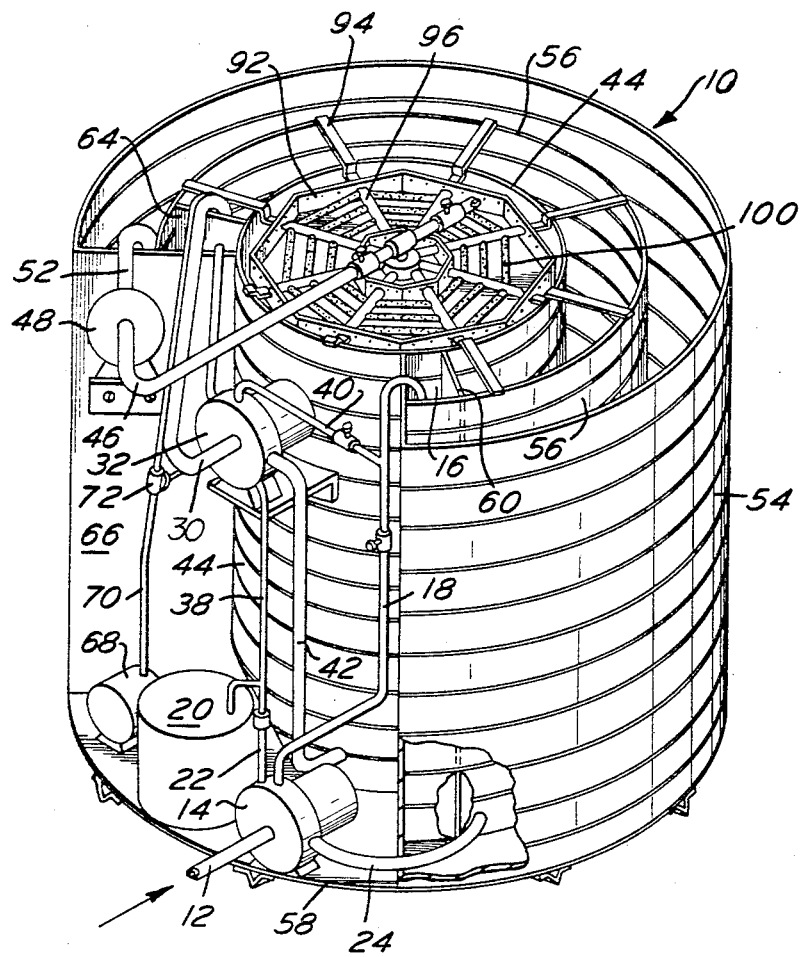
FIGURE 1 is a perspective view of the apparatus of the present invention.
Figure 2:
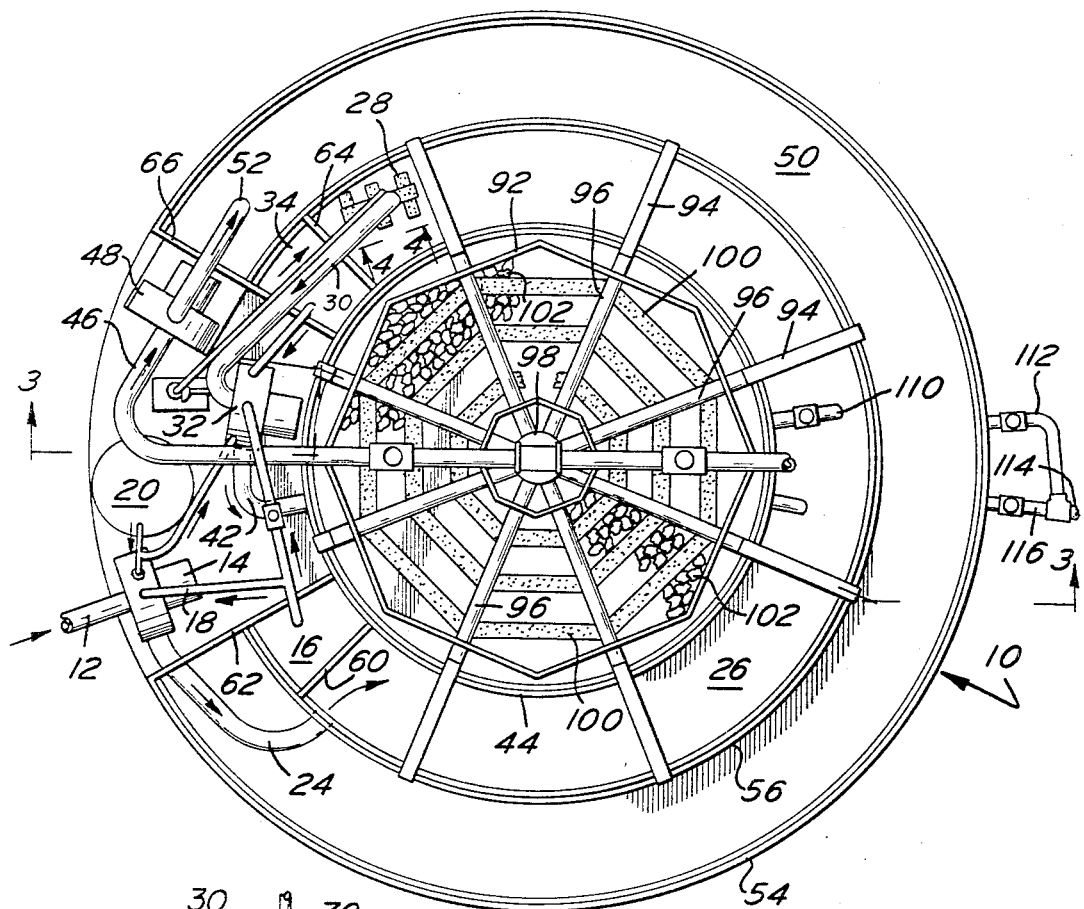
FIGURE 2 is a top plan view of the apparatus of the present invention.

As shown more clearly in FIGURES 1 and 2, the sludge chamber 26 and storage chamber 50 are generally horseshoe-shaped and concentrically disposed around the upflow clarifier 44. The storage chamber 50 is defined by the horseshoe-shaped walls 54 and 56 extending upwardly from the bottom wall 58. The clarifier 44 is also mounted on the bottom wall 58 and is sealed thereto at the bottom peripheral edge of the clarifier in any convenient manner such as by welding.

The tank 16 is formed by means of a radial wall 60 extending between the clarifier 44 and the wall 56. A radial wall 62 is provided spaced from the wall 60. It will be noted from FIGURE 2 that wall 62 extends between the clarifier 44 and one edge of the wall 54. One edge of the wall 56 is sealingly connected to an intermediate portion of wall 62. Thus, the tank 16 is a segment of the horseshoe-shaped chamber between the clarifier 44 and the wall 56.

The tank 34 is likewise a segmental tank forming a part of the horseshoe-shaped chamber between the clarifier 44 and the wall 56. Tank 34 is defined on one side by a radial wall 64 extending between the clarifier 44 and the wall 56. The other side of tank 34 is defined by wall 66 extending between the clarifier 44 and the other end of the wall 54. The other end of wall 56 is likewise sealingly connected to a central portion of wall 66. The bottom wall 58 forms a bottom for the tanks 34 and 16. The sludge chamber 26, storage chamber 50, tanks 16 and 34, and the upflow clarifier are open at the top. If desired, a cover may be provided.

As a result of the above disposition of chambers and tanks, there is provided a segmental area defined by radial walls within which the pumps, valves and conduits may be disposed. Also located with said area is an air compressor 68 (see FIGURES 1 and 6). Compressor 68 is connected to the filters 28 by way of conduit 70 having valve 72 therein. Valve 72 may be coupled to conduit 24 so as to be responsive to the pressure therein. When the pressure within conduit 24 decreases below a predetermined level, valve 72 will be opened so as to facilitate the introduction of pressurized air into the filters 28 to cause extraneous matter thereon to be blown off. Thus, as foreign matter collects on the filters 28, they plug up the perforations therein. The filters may be wholly or in part made from a flexible material. The introduction of pressurized air causes the foreign matter to be moved away from the filters. The rapidity with which air may be introduced into the filters will simulate a pulsing of air.

Figure 4:
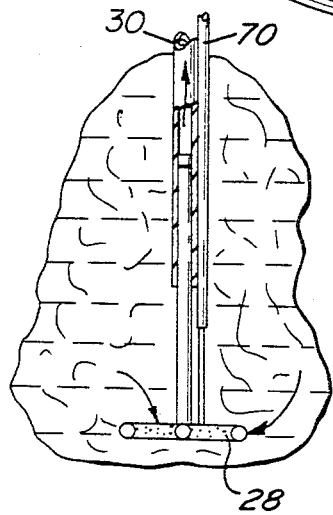
FIGURE 4 is a view taken along the line 4—4 in FIGURE 2.

As shown more clearly in FIGURE 4, the filters 28 are vertically adjustable and communicate with a manifold connected to conduit 24. For ease of installation, the conduits described above are preferably flexible.

Referring to FIGURE 3, the pretreated liquid mixed with the various chemicals as described above discharges from pump 32 by way of conduit 42. Conduit 42 terminates in an upwardly discharge portion 42′ disposed within a diffusion chamber having an imperforate base 76 and a radially outwardly tapered generally cylindrical wall 78. Wall 78 is connected to the upflow clarifier 44 by way of spiders 80 with its lowermost edge spaced from the bottom wall 58.

A means is provided to positively define the upper limit of the floc blanket 82 within the upflow clarifier 44. Such means includes a porous substrate 86 reinforced on its upper surface with a metal screen 88. Substrate 86 is supported within the clarifier 44 and spaced from the upper edge thereof. Conduit 84 communicates with the clarifier 44 immediately below the substrate 86 and has its discharge end located adjacent the bottom wall 58 within the sludge chamber 26.

Substrate 86 may be made from a wide variety of materials. I prefer to use a rigid polymeric plastic material which is porous and capable of filtering out particles having a size greater than 25 microns. Such a material is sold commercially as Vyon. The lower surface of the substrate 86 is preferably a smooth surface for quick release of the floc blanket 82 during backflow. A chamber 90 is provided in the upflow clarifier above the screen 88. For many commercial establishments, the effluent within chamber 90 may by recycled back into the system for use. If it is desired to further purify the effluent in chamber 90, additional filtering may be provided. Such additional filtering may be required due to the high concentrations of impurities in the waste liquids delivered to the apparatus 10 by way of conduit 12 or due to the requirement of highly purified liquids for the system with which the apparatus 10 is to be associated. Such additional filtering may be accomplished by the provision of an open-topped tray 92 which is doughnut-shaped and has an octagonal inner and outer periphery.

A plurality of holes or notches are provided adjacent the upper edge of tray 92 on its inner and outer periphery to facilitate entry of the effluent from chamber 90 into the tray 92. A plurality of brackets 94 extend over the upper edge of wall 56 and the clarifier 44 to the closed end of collection tubes 96. Collection tubes 96 may have one end adjacent the brackets 94 or closed by flattening the same. The flattened ends of the tubes 96 are integrally connected to the brackets and thereby facilitate supporting the tray 92.

As shown more celarly in FIGURES 1 and 2, the collection tubes 96 extend radially outwardly like spokes from a manifold 98. A plurality of filter tubes 100 extend between adjacent collection tubes 96. Filter tubes 100 are hollow tubes made from a porous filtering material such as Vyon. The ends of the tubes 100 communicate with the interior of the hollow collection tubes 96. Additional filtering action is provided by filling in the remainder of the tray 92 with a filtering medium such as charcoal 102 which overlies the collection tubes 96 and the filter tubes 100.

The filtered effluent is removed from the manifold 98 by way of the discharge conduit 46 having a valve 104 therein. Conduit 46 is connected to one leg of a T 104. Another leg of the T 104 is connected to the manifold 98. The remaining leg of the T 104 is connected to one end of a backwash conduit 106 having a valve 108 therein.

To facilitate backwashing and draining of the tray 92, a valved drain conduit 110 is provided. Conduit 110 provides selective communication from the bottom of tray 92 to the interior of chamber 44. A valved drain conduit 112 provides selective communication between a drainage conduit and the bottom of the upflow clarifier 44. A similar valved drain conduit 116 provides selective communication between said conduit 114 and the bottom of the sludge accumulation chamber 44.

Various conventional controls may be provided and are not shown. In this category would fall controls such as float control switches for the various chambers and tanks which would shut off the power to the pumps and motors when the level fell below or rose above a predetermined desired level.

The operation of the apparatus 10 is as follows:

It will be assumed that the industrial waste liquid supplied by conduit 12 contains turbidity, ABS, settlable solids, colloidal suspensions, phosphates, BOD (biochemical oxygen demand), COD (chemical oxygen demand), etc. Suitable metering valves or indicators may be provided in the conduits where desired to control the rate of flow therethrough.

With certain industrial waste liquids such as those associated with a paper pump mill and containing settlable solids, turbidity, and other impurities such as tannin, a pretreating of the liquid is provided by passing the same through the sludge chamber 26. In the sludge chamber 26, the raw liquid is in contact with the sludge and coagulant therein to effect a pretreating and filtration of the raw liquid. In addition to the coagulant which may exist in the sludge chamber 26, additional coagulant may be introduced to the inlet side of pump 14 by way of valved conduit 18. Likewise, a bleaching chemical such as chloride may be added to the raw liquid before it is introduced into the sludge chamber 26.

As a result of the pretreating within sludge chamber 26, the raw liquid will be bleached. With the industrial waste liquid containing a substantial amount of tannin, the liquid will have a brown color similar to the color of chocolate. The chlorine will bleach the color so that it is substantially colorless and appears to have the color of water. The coagulant will cause the large suspended solids to accumulate and thereby prevent the same from passing through the filter 28. As a result of this pretreating, the requirement for the porous substrate and upflow clarifier are reduced to an extent that the filtering action required thereby is reduced. Hence, the apparatus 10 may have longer runs while processing heavily contaminated industrial waste liquids as compared with the same apparatus which lacks the pretreatment within the sludge chamber. In this regard, it will be noted that the sludge chamber exists as per the disclosure in the above-mentioned copending application.

Hence, the present invention takes advantage of existing facilities and causes them to perform a pretreating operation while providing minimal equipment to effect the same.

Coagulated suspended solids, turbidity and the like within the sludge chamber will accumulate on the vertically adjustable filters 28. This will cause the pressure within conduit 30 to drop since conduit 30 is connected to the inlet side of pump 32. This drop in pressure in conduit 30 will be detected and can be utilized to control valve 72 which in turn controls the pulsing of air of compressor 68 through the filters 28. The pulsing of air will clean the surface of the filters so as to enable the system to operate continuously.

Figure 5:
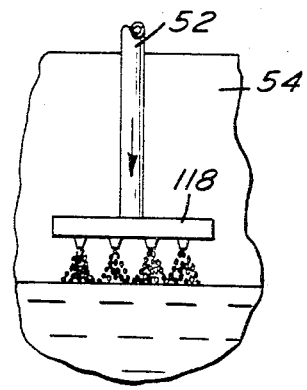
FIGURE 5 is a partial elevation view of apparatus for aerating the water returned to the storage chamber.

The effluent from chamber 90 or further filtered and existing in conduit 46 will be pumped by pump 48 to a holding or storage chamber 50 which surrounds the sludge chamber 26. As the effluent is delivered by conduit 52 into chamber 50, it passes through an aerating nozzle 118 as shown more clearly in FIGURE 5. The nozzle 118 reintroduces oxygen into the effluent which in turn will kill certain types of bacteria and will at the same time render the effluent potable or usable for recycling through the process to be used with the apparatus 10.

The substrate 86 provides a positive upper limit for the floc blanket 82. Hence, the floc blanket 82 is not subject to being upset. Turbidity, suspended solids, colloidal suspensions and the like having a particle size less than 25 microns are filtered out by the floc blanket 82. Particles having a size greater than 25 microns are filtered out by the substrate 86. Apparatus 10 constructed in accordance with the present invention can produce an effluent in chamber 90 having a turbidity of about two or three parts per million and an ABS of about .1 part per million. Also, BOD and COD are substantially reduced.

Due to continuous operation of the apparatus 10, the thickness of the floc blanket 82 will increase until it approaches the base 76. It will be noted that the floc blanket is permitted to overflow through conduit 84 into the occumulation chamber. Any colloidal water which overflows from conduit 84 into the sludge chamber 26 will be returned by way of conduit 30 to the inlet side of pump 32 for reprocessing through the clarifier 44.

Sludge within chamber 26 may be dipped through the open top thereof. After the dipping operation, there will be some sludge left over on the bottom wall 58. The valve 104 may be closed and valve 108 opened. Thereafter, backwash liquid from conduit 106 may be introduced through the collection tubes 96 and filter tubes 100 into the tray 92. From tray 92, the backwashed liquid may flow through conduit 110, the valve of which has been opened. The valves in conduits 112 and 116 may be opened and the remainder of any sludge within the chamber 26 or the upflow clarifier 44 may be removed by flushing or spraying. The tray 92 is preferably removable as a unit so as to facilitate backwashing the substrate 82.

The apparatus 10 is ready for installation in almost any location. No expensive supports, underground locations or the like are required. As illustrated, the apparatus 10 is mounted on a skid for ease of handling.

Other well-known chemicals may be used in place of chlorine or the coagulant described above. Salts such as ferric chloride or ferric sulfate may be used as a coagulant. Lime may be used alone or in conjunction with a ferric sulfate as a coagulant. Other halogens, bleaching agents, or chemicals for removing or neutralizing dyes may be used in place of chlorine.

The present invention may be embodied in other specific forms without departing from the spirit or essential attributes thereof and, accordingly, reference should be made to the appended claims, rather than to the foregoing specification as indicating the scope of the invention.

I claim:
1. Water treating apparatus comprising an upflow clarifier, a diffusion chamber within a bottom portion of said clarifier for receiving a liquid to be treated therein, porous limit means within said clarifier defining a positive upper limit for a floc blanket, a conduit for transporting the effluent which passes through the limit means away from the clarifier, chamber means for pretreating the liquid before it is delivered to the clarifier, said chamber means being disposed around a substantial portion of said clarifier, and a pump for removing the liquid from the chamber means and delivering it to the clarifier.

2. Apparatus in accordance with claim 1 wherein said limit means is a porous substrate for filtering out large particles in the water, and means for supporting the substrate within said clarifier.

3. Apparatus in accordance with claim 1 including means for introducing and mixing a coagulant with the liquid to be treated before the liquid is introduced into the chamber means.

4. Apparatus in accordance with claim 1 wherein said chamber means surrounds said clarifier, and a holding tank partially surrounds said chamber means.

5. Apparatus in accordance with claim 4 including means for aerating an effluent before it is delivered to the holding tank.

6. Apparatus in accordance with claim 1 including a filter in said chamber means, a pump for pumping filtered liquid from said filter to said diffusion chamber, and means for cleaning the filter.

7. Apparatus in accordance with claim 6 wherein said cleaning means includes an air compressor coupled to the filter for delivering pressurized air to the filter.

8. Water treating apparatus comprising a sludge chamber for receiving water to be treated, means for withdrawing liquid from the sludge chamber, means for adding a coagulant to the water removed from the sludge chamber, an upflow clarifier, means for delivering liquid removed from the sludge chamber and containing a coagulant to the bottom of the upflow clarifier, means defining a floc blanket within the clarifier through which the liquid may pass and be filtered, means providing communication from the clarifier at a point adjacent the upper end thereof and the lower portion of the sludge chamber, and a pump connected with the upper portion of the clarifier for pumping effluent from the clarifier to a holding tank.

9. A method of treating waste liquids comprising the steps of pretreating the liquid in a manner which includes passing the liquid through a sludge chamber, pumping the thusly treated liquid from said chamber and adding chemicals thereto including a coagulant, delivering the thusly treated liquid and coagulant to the bottom of on upflow clarifier wherein the mixture moves upwardly through a floc blanket, preventing the floc blanket from being upset and removed along with effluent by contacting the upper surface of the blanket with a porous medium through which effluent may flow, providing communication between an upper portion of the clarifier at the level of the floc blanket and a bottom portion of the sludge chamber so that some coagulant from the floc blanket may flow into said sludge chamber, and withdrawing effluent from the upper end of the clarifier at a level above the location of said porous medium.

10. A method in accordance with claim 9 wherein said pretreating step includes mixing the liquid with chlorine.

11. A method in accordance with claim 9 including storing the effluent in a holding tank at least partially disposed around the chamber.

12. A method in accordance with claim 11 including the step of aerating the effluent as it is introduced into the holding tank.

13. A method of treating waste liquids comprising the steps of pretreating the liquid in a manner which includes passing the liquid through a sludge chamber, withdrawing the thusly treated liquid from said chamber, adding chemicals thereto including a coagulant, delivering the thusly treated liquid and coagulant to the bottom of an upflow clarifier wherein the mixture moves upwardly through a floc blanket, providing communication between the upper portion of the clarifier and a bottom portion of the sludge chamber, withdrawing the effluent from the upper end of the clarifier, filtering the liquid removed from the sludge tank before delivering the liquid to the clarifier, and preventing the filter from clogging by use of compressed air.

References Cited
UNITED STATES PATENTS

| | | | |
|---|---|---|---|
| 677,669 | 7/1901 | Koyl | 210—205 |
| 1,195,537 | 8/1916 | Van Vloten | 210—207 |
| 1,784,132 | 12/1930 | Cabrera | 210—311 X |

MICHAEL E. ROGERS, *Primary Examiner.*